J. TALLMAN.
Bee Hive.
No. 82,363.
Patented Sept. 22, 1868.
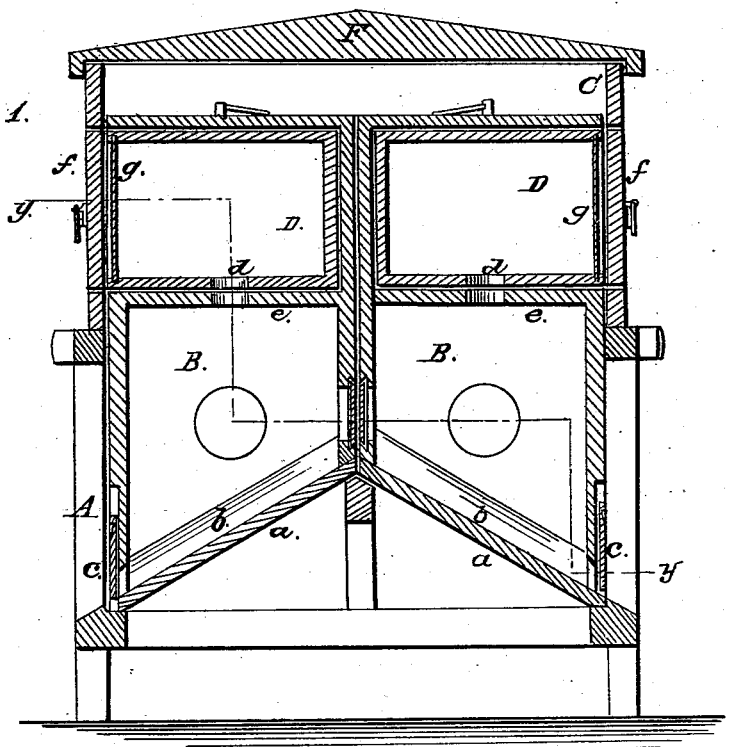
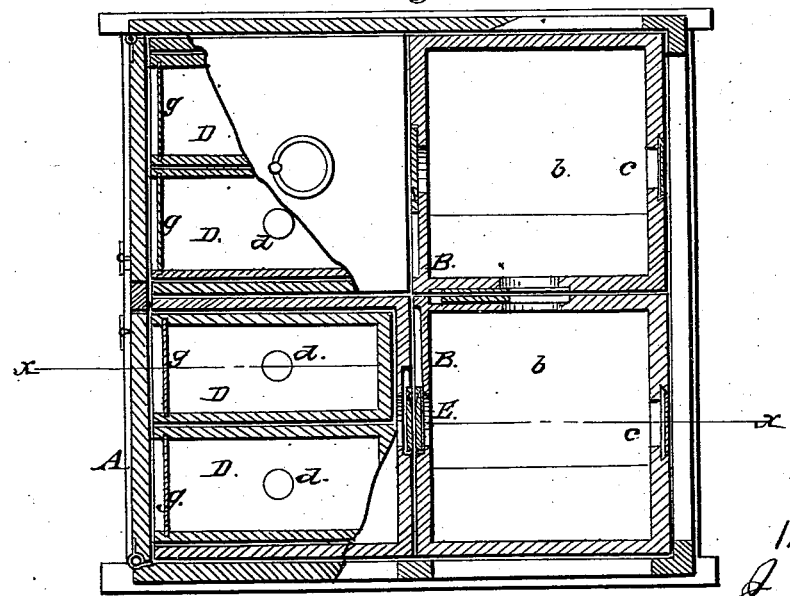

United States Patent Office.

JAMES TALLMAN, OF CLAYTON, ILLINOIS.

Letters Patent No. 82,363, dated September 22, 1868.

IMPROVEMENT IN BEE-HIVES.

*The Schedule referred to in these Letters Patent and making part of the same.*

TO ALL WHOM IT MAY CONCERN:

Be it known that I, JAMES TALLMAN, of Clayton, in the county of Hamilton, and State of Illinois, have invented a new and improved Bee-House; and I do hereby declare that the following is a full, clear, and exact description thereof, which will enable others skilled in the art to make and use the same, reference being had to the accompanying drawings, forming part of this specification.

This invention relates to a new and useful improvement in bee-houses or hives, and which I term "The Community-Hive."

The invention consists in a novel construction and arrangement of parts, whereby several hives may be placed in one house, and any two or all of them made to communicate with each other, as required, so that the hives may be kept separate or independent from each other, if it be desired to have the bees swarm, or made to communicate with each other, and multiply colonies, if swarming is not desired.

In the accompanying sheet of drawings—

Figure 1 is a vertical section of my invention, taken in the line $x\,x$, fig. 2.

Figure 2, a horizontal section of the same, taken in the line $y\,y$, fig. 1.

Similar letters of reference indicate corresponding parts.

A represents a rectangular frame, which may be constructed in any proper manner, to insure strength and durability, and has inclined bars, $a$, fitted and secured in its lower part to support the hives B, four (more or less) in number.

These bars $a$ incline downward from their inner to their outer ends, as shown clearly in fig. 1, and the bottoms $b$ of the hives B are inclined in a corresponding manner, so that they may rest upon the bars $a$. This inclination of the bottoms $b$ admits of the escape or discharge of dirt or filth towards the doors $c$ at the lower parts of the outer sides or fronts of the hives, the doors, when raised a trifle, admitting of bee-entrances to the hives.

The hives are arranged in pairs, the backs of the two pairs being placed in contact with each other, (see fig. 1,) and on the upper part of the frame A there is secured a box, C, which tightly encloses the upper parts of the hives, in which the spare-honey boxes D are fitted, openings, $d$, being made in the bottoms of the boxes D and in the partitions $e$, on which the boxes D rest, to admit of the bees passing up from the lower parts of the hives into the spare-honey boxes.

In the sides of the box C there are doors, $f$, through which the spare-honey boxes D may be taken from the hives; the latter, above the partitions $e$, being open, and the outer sides of the boxes D having glass, $g$, fitted therein, so that the contents of said boxes may be inspected whenever desired.

The several hives B may be made to communicate with each other, when desired, by means of slides E, so that if one filled or inhabited hive be placed in the frame, the others may be supplied with colonies from it, and swarming be thereby avoided.

The box C is provided with a lid, F, which, when removed, admits of the hives B being readily inserted into and withdrawn from the frame.

Having thus described my invention, what I claim as new, and desire to secure by Letters Patent, is—

1. The arrangement and combination of a series of hives, provided with inclined bottoms, and resting on inclined bars, $a$, within a frame, in such a manner that the several hives may be made to communicate with or cut off from each, as may be desired, substantially as shown and described.

2. The house, composed of the frame A and box C, the latter being provided with doors, $f$, and with a lid or detachable top, F, when said house, thus constructed, is used in connection with a plurality of hives, B, adapted to the house or frame, in the manner substantially as and for the purpose set forth.

The above specification of my invention signed by me, this 11th day of April, 1868.

JAMES TALLMAN.

Witnesses:
  S. J. MOREY,
  JAMES HAYLET.